United States Patent
Hedekvist et al.

(10) Patent No.: US 8,615,170 B2
(45) Date of Patent: Dec. 24, 2013

(54) METHOD AND SYSTEM FOR ONE-WAY TIME TRANSMISSION

(75) Inventors: Per Olof Hedekvist, Molndal (SE); Sven-Christian Ebenhag, Boras (SE)

(73) Assignee: SP Svergies Tekniska Forskningsinstitut AB, Borås (SE)

( * ) Notice: Subject to any disclaimer, the term of this patent is extended or adjusted under 35 U.S.C. 154(b) by 126 days.

(21) Appl. No.: 13/502,543

(22) PCT Filed: Nov. 11, 2010

(86) PCT No.: PCT/SE2010/051242
§ 371 (c)(1),
(2), (4) Date: Apr. 18, 2012

(87) PCT Pub. No.: WO2011/059387
PCT Pub. Date: May 19, 2011

(65) Prior Publication Data
US 2012/0213529 A1 Aug. 23, 2012

(30) Foreign Application Priority Data

Nov. 12, 2009 (SE) ...................................... 0901439

(51) Int. Cl.
*H04B 10/00* (2013.01)
*H04L 7/00* (2006.01)

(52) U.S. Cl.
CPC .................................... *H04L 7/0075* (2013.01)
USPC ......................................... 398/154; 398/163

(58) Field of Classification Search
USPC ................................................. 398/154, 163
See application file for complete search history.

(56) References Cited

U.S. PATENT DOCUMENTS

| 4,287,606 | A |  | 9/1981 | Lutes, Jr. et al. |
| 4,551,019 | A |  | 11/1985 | Vella et al. |
| 5,206,753 | A | * | 4/1993 | Grimes ........................... 398/48 |
| 5,406,368 | A |  | 4/1995 | Horiuchi et al. |
| 6,594,003 | B1 | * | 7/2003 | Horiuchi et al. ............. 356/73.1 |
| 6,788,410 | B1 |  | 9/2004 | Otani et al. |
| 8,331,784 | B2 | * | 12/2012 | Mizutani et al. ................ 398/70 |

(Continued)

OTHER PUBLICATIONS

Wiberg et al., Dispersion-Tolerant Millimeter-Wave Photonic Link Using Polarization-Dependent Modulation, Journal of Lightwave Technology, vol. 25, No. 10, Oct. 2007, pp. 2984-2991. Houston, TX, US.

(Continued)

*Primary Examiner* — Dalzid Singh
(74) *Attorney, Agent, or Firm* — Babcock IP, PLLC

(57) ABSTRACT

A method of controlling a timing state of a local oscillator (17) being synchronized by a timing signal ($S_{T1}$) provided through one-way transmission from a remote master oscillator (6) through a dielectric waveguide (4). The method comprises the steps of: receiving (101) a first timing signal ($S_{T1}$) modulated on a first electromagnetic carrier having a first carrier wavelength ($\lambda_1$) and transmitted through the dielectric waveguide (4); receiving (101) a second timing signal ($S_{T2}$) modulated on a second electromagnetic carrier having a second carrier wavelength ($\lambda_2$) different from the first carrier wavelength ($\lambda_1$) and transmitted through the dielectric waveguide (4) together with the first timing signal ($S_{T1}$); providing (102) a signal ($S_{diff}$) indicative of a difference between a transmission time ($T_1$) of the first timing signal ($S_{T1}$) and a transmission time ($T_2$) of the second timing signal ($S_{T2}$) through the dielectric waveguide; and controlling (103) the timing state of the local oscillator (17) based on the first timing signal ($S_{T1}$) and the signal ($S_{diff}$) indicative of the difference between the transmission time ($T_1$) of the first timing signal ($S_{T1}$) and the transmission time ($T_2$) of the second timing signal ($S_{T2}$).

13 Claims, 3 Drawing Sheets

(56) References Cited

U.S. PATENT DOCUMENTS

2009/0067850 A1 3/2009 Mizutani et al.
2011/0299853 A1* 12/2011 Zampetti et al. ................ 398/98

OTHER PUBLICATIONS

Emardson et al., Time and Frequency Transfer in an Asynchronous TCP/IP over SDH-network Utilizing Passive Listening. p. 909-913, Frequency Control Symposium and Exposition, 2005 Proceedings of the 2005 IEEE International, Aug. 2005.

Ebenhag et al., Measurements and Error Sources in Time Transfer Using Asynchronous Fiber Network, Instrumentation and Measurement, IEEE Transactions, vol. PP, Issue 99, 5, p. 1-6, Oct. 2009.

* cited by examiner

METHOD AND SYSTEM FOR ONE-WAY TIME TRANSMISSION

TECHNICAL FIELD OF THE INVENTION

The present invention relates to a method of controlling a timing state of a local oscillator being synchronized by a timing signal provided by means of one-way transmission from a remote master oscillator through a dielectric waveguide, to a time receiver, for providing a time indication based on a timing signal provided through one-way transmission from a remote master oscillator through a dielectric waveguide, and to a system for one-way time transmission.

TECHNICAL BACKGROUND

In today's society, absolute and coordinated time (hereinafter denoted Time) is an important parameter, and the importance of having a correct and reliable Time is expected to increase even further in the future.

In most countries, Time is related to the so-called Coordinated Universal Time (UTC), and for a user to access Time, a connection is established to a physical realization of UTC (referred to as UTC(k)) which is embodied as a high performance master oscillator. No matter how accurate this master oscillator is, there will be some transmission delay in the connection between the master oscillator and the user, which will influence the Time that is transferred. Furthermore, the transmission delay will typically vary. To achieve a correct transfer of Time, this variation in transmission delay must be compensated for.

One method of handling the variation in transmission delay is to employ so-called two-way transfer. A signal indicative of the Time is returned from the user to the source of Time. Based on this signal, the source can determine the transmission delay, and send information about the transmission delay to the user. However, this method requires two-way communication to each user that is connected to a particular source of Time, which may require extensive installation and limits the number of users that a certain source of Time can service.

According to another method of handling the variation in transmission delay, satellite signals from several GPS-satellites are used. However, many users do not have access to outdoor antennas. Furthermore, there is vulnerability in the weak radio-transmission from the satellites as well as the dependence on the continuous replacement of old and outdated satellites.

SUMMARY OF THE INVENTION

In view of the above-mentioned and other drawbacks of the prior art, a general object of the present invention is to provide an improved transmission of absolute time, and in particular an improved way of handling variations in transmission delay between a source of Time and a user of Time.

According to a first aspect of the present invention, these and other objects are achieved through a method of controlling a timing state of a local oscillator being synchronized by a timing signal provided through one-way transmission from a remote master oscillator through a dielectric waveguide, the method comprising the steps of: receiving a first timing signal modulated on a first electromagnetic carrier having a first carrier wavelength and transmitted through the dielectric waveguide; receiving a second timing signal modulated on a second electromagnetic carrier having a second carrier wavelength different from the first carrier wavelength and transmitted through the dielectric waveguide together with the first timing signal; providing a signal indicative of a difference between a transmission time of the first timing signal and a transmission time of the second timing signal through the dielectric waveguide; and controlling the timing state of the local oscillator based on the first timing signal and the signal indicative of the difference between the transmission time of the first timing signal and the transmission time of the second timing signal.

It should be noted that the method of the present invention by no means is limited to performing the steps thereof in any particular order. Furthermore, some steps may be performed at one point in time, and other steps at another point in time.

The present invention is based on the realization that variations in transmission time through a dielectric waveguide can be deduced by studying the variation in the difference in transmission time between simultaneously transmitted signals modulated on electromagnetic carriers having different wavelengths. There is a one-to-one relationship between the change in transmission time from an initial transmission time to an instantaneous transmission time, and the change in wavelength-dependent transmission time difference from an initial wavelength-dependent transmission time difference to an instantaneous wavelength-dependent transmission time difference. Given that the transmission properties of the dielectric waveguide, such as the temperature dependence of the (wavelength-dependent) propagation velocity through the dielectric waveguide, are at least approximately known, the above-mentioned change in transmission time can be deduced from a measured change in wavelength-dependent transmission time.

Through the various aspects of the present invention, it thus becomes possible to compensate for variations in transmission time through a dielectric waveguide based on a determined change in the above-mentioned wavelength-dependent transmission time. Hence, accurate absolute time (Time) can be transmitted by means of one-way transmission through a dielectric waveguide only requiring an initial calibration of the time receiver and at least approximate knowledge of the transmission properties of the dielectric waveguide.

This means that there is no need for two-way transmission between the source of Time and the user. There is also no need for satellite transmission. Accordingly, a simpler and/or more reliable way of accurately transmitting Time is provided.

According to one embodiment of the method according to the present invention, the step of controlling the timing state may comprise the steps of: delaying the first timing signal based on the signal indicative of the difference between the transmission time of said first timing signal and the transmission time of said second timing signal to form a delayed first timing signal; and synchronizing the local oscillator using the delayed first timing signal.

The delay may be either positive or negative. An instantaneous transmission time that is less than the initial transmission time is compensated for with a positive delay, while an instantaneous transmission time that is greater than the initial transmission time is compensated for with a negative delay.

According to another embodiment of the method according to the present invention, the step of controlling the timing state may comprise the steps of: synchronizing the local oscillator using the first timing signal; and controlling a frequency of the local oscillator using the signal indicative of the difference between the transmission time of said first timing signal and the transmission time of said second timing signal.

The local oscillator may, for example, be a voltage controlled oscillator. The signal indicative of the wavelength-dependent difference in transmission time may then be a voltage signal, which may, directly or indirectly, be used to control the voltage controlled oscillator.

The first timing signal and the second timing signal may be provided by the remote master oscillator.

Furthermore, the first timing signal and the second timing signal may be in phase when entering the dielectric waveguide.

Moreover, the first and second timing signal may be sine waves of a suitable frequency, such as 10 MHz.

According to a second aspect of the present invention, the above-mentioned and other objects are achieved through a time receiver, for providing a time indication based on a timing signal provided through one-way transmission from a remote master oscillator through a dielectric waveguide, the time receiver comprising: combining circuitry arranged to receive a first timing signal modulated on a first electromagnetic carrier having a first carrier wavelength and transmitted through the dielectric waveguide; and a second timing signal modulated on a second electromagnetic carrier having a second carrier wavelength different from the first carrier wavelength and transmitted through the dielectric waveguide together with the first timing signal, the combining circuitry being configured to output a signal indicative of a difference between a transmission time of the first timing signal and the second timing signal through the dielectric waveguide; and a local oscillator being controllable to provide the time indication based on the first timing signal and the signal indicative of the difference between the transmission time of the first timing signal and the second timing signal through the dielectric waveguide.

The combining circuitry may advantageously comprise: a first sensor arranged and configured to convert the first timing signal to a first electrical timing signal; a second sensor arranged and configured to convert the second timing signal to a second electrical timing signal; and a mixer arranged to receive the first electrical timing signal and the second electrical timing signal and configured to output the signal indicative of the difference between the transmission time of the first timing signal and the second timing signal through the dielectric waveguide.

According to various embodiments, the time receiver may further comprise delay circuitry arranged to receive the first timing signal and the signal indicative of the difference between the transmission time of the first timing signal and the second timing signal through the dielectric waveguide, and configured to adjust a delay of the first timing signal by a delay time based on the signal indicative of the difference.

Moreover, the local oscillator may be a controllable oscillator being arranged to be controlled using the signal indicative of the difference between the transmission time of the first timing signal and the second timing signal through the dielectric waveguide. The controllable oscillator may, for example, be a so-called voltage controllable oscillator.

According to one embodiment of the time receiver according to the present invention, the first and second electromagnetic carriers may be optical carriers, and the dielectric waveguide may be an optical fiber.

Furthermore, various embodiments of the time receiver according to the present invention may advantageously be included in a one-way time transmission system, further comprising a time transmitter comprising: a first source arranged to provide a first electromagnetic carrier having a first carrier wavelength; a second source arranged to provide a second electromagnetic carrier having a second carrier wavelength different from the first carrier wavelength; and a master oscillator arranged to control the first source and the second source to modulate a timing signal on the first electromagnetic carrier and on the second electromagnetic carrier.

Further effects and features of this second aspect of the present invention are largely analogous to those described above in connection with the first embodiment.

BRIEF DESCRIPTION OF THE DRAWINGS

These and other aspects of the present invention will now be described in more detail, with reference to the appended drawings showing at least one example embodiment of the invention, wherein.

DETAILED DESCRIPTION OF AN EXAMPLE EMBODIMENT OF THE INVENTION

In the present detailed description, various embodiments of the present invention are mainly discussed with reference to a system and system components for one-way time transmission using light that is guided by an optical fiber.

It should be noted that this by no means limits the scope of the present invention and that the present invention is equally applicable to one-way time transmission using electromagnetic waves in other wavelength ranges, which are transmitted through suitable dielectric waveguides.

Figure 1:
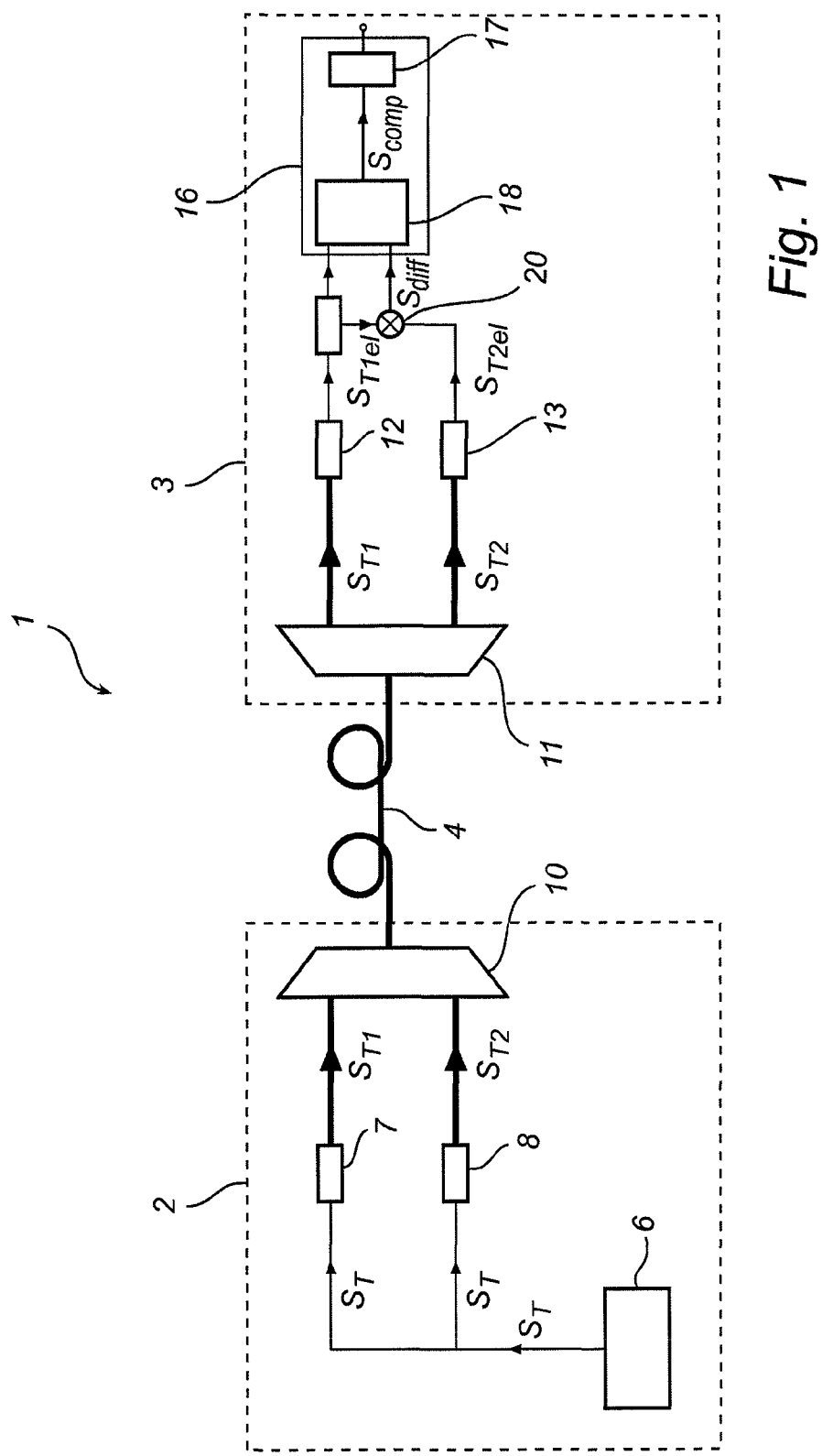
FIG. 1 is a schematic illustration of a one-way time transmission system according to an example embodiment of the present invention.

FIG. 1 schematically shows a one-way time transmission system 1 according to an embodiment of the present invention, comprising a time transmitter 2 for transmitting timing signals, and a time receiver 3 for receiving the timing signals. The time transmitter 2 and the time receiver 3 are interconnected by a dielectric waveguide, here in the form of an optical fiber 4 having known transmission properties. The optical fiber 4 may have been previously characterized through testing, or material properties and dimensions of the optical fiber may be known. Thin lines in FIG. 1 represent electrical interconnects, while bold lines represent optical fibers.

The time transmitter 2 comprises a master clock 6, which is a highly accurate oscillator or signal generator that may be synchronized with a reference time, such as the Coordinated Universal Time that was mentioned in the Background section. The master clock 6 is arranged to control a first laser 7 and a second laser 8 to modulate the light output by the first 7 and second 8 lasers by the same constant frequency timing signal $S_T$, which may, for example, be a 10 MHz signal. The first laser 7 is controllable to provide a first electromagnetic carrier in the form of light at a first wavelength $\lambda_1$, for example 1310 nm, and the second laser 8 is controllable to provide a second electromagnetic carrier in the form of light at a second wavelength $\lambda_2$, for example 1550 nm.

When the first 7 and second 8 lasers are provided with the timing signal $S_T$ from the master clock 6, a first timing signal $S_{T1}$ modulated on the first carrier wavelength $\lambda_1$ and a second timing signal $S_{T2}$ modulated on the second carrier wavelength $\lambda_2$ are generated. The first $S_{T1}$ and second $S_{T2}$ timing signals are combined in a in a WDM (Wavelength Division Multiplexing) coupler 10 and injected into the optical fiber 4.

The first $S_{T1}$ and second $S_{T2}$ timing signals travel together through the optical fiber 4 until they reach the time receiver 3.

The time receiver 3 comprises a WDM-splitter 11 for splitting incoming light by wavelength into the first $S_{T1}$ and second $S_{T2}$ timing signals. The first timing signal $S_{T1}$ is subsequently converted into a first electrical timing signal $S_{T1el}$ by a first optoelectronic detector 12, and the second timing signal $S_{T2}$ is converted into a second electrical timing signal $S_{T2el}$ by a second optoelectronic detector 13. In the exemplary time receiver configuration of FIG. 1, the first electrical timing signal $S_{T1el}$ is divided by divider circuitry, such as a WPD (Wilkinson Power Divider) 15. One portion of the first electrical timing signal $S_{T1el}$ is provided to local timing circuitry 16, comprising a controllable local oscillator 17 (also referred to as "slave clock") and signal processing circuitry 18, and another portion of the first electrical timing signal $S_{T1el}$ is provided to combining circuitry, here in the form of a mixer 20. Also input to the mixer 20 is the second electrical timing signal $S_{T2el}$. Output from the mixer 20 is a difference signal $S_{diff}$ indicative of a difference $\Delta T_{12}$ between a transmission time $T_1$ through the optical fiber 4 of the first timing signal $S_{T1}$ and a transmission time $T_2$ through the optical fiber 4 of the second timing signal $S_{T2}$. The difference signal $S_{diff}$ is provided to the local timing circuitry 16.

In the local timing circuitry, the first electrical timing signal $S_{T1el}$ and/or the difference signal $S_{diff}$ is/are conditioned by the signal processing circuitry 18 to provide a compensation signal $S_{comp}$ that can be used to control the controllable oscillator 17 to compensate for variations over time of the transmission delay caused by the transmission of the timing signals through the optical fiber 4.

The signal processing circuitry 18 may be analog and/or digital circuitry that is configured to convert the difference signal $S_{diff}$ to the compensation signal $S_{comp}$ based on the relations provided below under the heading "Theory". It should, however, be noted that the relation between the compensation signal $S_{comp}$ and the difference signal $S_{diff}$, and thus the configuration of the signal processing circuitry, may advantageously be determined empirically, for example by correlating the difference signal $S_{diff}$ with a measured value of the variations in transmission time for a certain period of time prior to installation/configuration of the one-way time transmission system 1.

Figure 2:
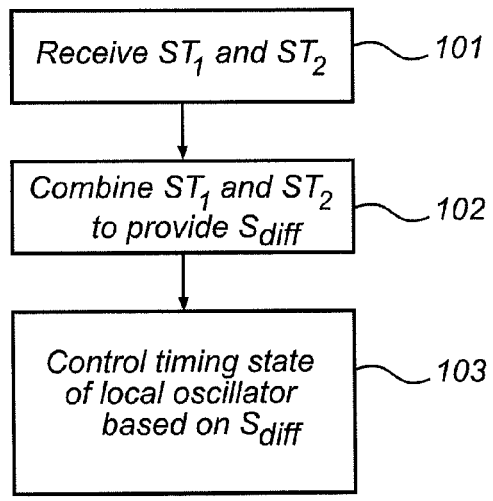
FIG. 2 is a flow chart schematically illustrating an embodiment of the method according to the present invention.

An embodiment of the method according to the present invention will now be described with reference to the flow-chart in FIG. 2 as well as the one-way time transmission system 1 in FIG. 1.

In a first step 101, a first timing signal $S_{T1}$ modulated on a first electromagnetic carrier having a first wavelength $\lambda_1$ and transmitted through a dielectric waveguide 4 is received, and a second timing signal $S_{T2}$ modulated on a second electromagnetic carrier having a second wavelength $\lambda_2$ different from the first wavelength $\lambda_1$ is received. The first $S_{T1}$ and second $S_{T2}$ timing signals have been transmitted together through the same dielectric waveguide 4, and any initial phase difference between the first $S_{T1}$ and the second $S_{T2}$ timing signals is known. Advantageously, the first $S_{T1}$ and the second $S_{T2}$ timing signals may be substantially in phase when entering the dielectric waveguide 4.

Subsequently, in step 102, a signal $S_{diff}$ indicative of a difference between a transmission time of the first timing signal $S_{T1}$ and a transmission time $T_2$ of the second timing signal $S_{T2}$ through the dielectric waveguide 4 is provided. The difference signal $S_{diff}$ may be provided by combining the first timing signal $S_{T1}$ and the second timing signal $S_{T2}$ as was described above in connection with FIG. 1. Other exemplary ways of providing the difference signal $S_{diff}$ will be described below with reference to FIG. 4, which schematically illustrates an additional embodiments of the time receiver according to the present invention.

The present inventor has realized that the difference signal $S_{diff}$ can be used to control the timing state of the local oscillator 17 on the receiver side 3 of the one-way time transmission system 1. In particular, the variations in transmission delay through the dielectric waveguide 4 can be compensated for, given that transmission properties of the dielectric waveguide 4 are known and an initial transmission delay through the dielectric waveguide 4 is known.

Finally, in step 103, the timing state of the local oscillator 17 is thus controlled based on the first timing signal $S_{T1}$ and the difference signal $S_{diff}$. The difference signal $S_{diff}$ may, for example, be used to delay the first timing signal $S_{T1}$ such that a delayed version of the first timing signal is provided to the local oscillator 17. Alternatively, the difference signal $S_{diff}$ may be used to control the oscillation frequency of the local oscillator 17.

A theoretical basis for the above-mentioned realization that the difference signal $S_{diff}$ can be used to compensate for variations in transmission delay through the dielectric waveguide 4 is provided below under the heading "Theory" for the illustrative example of transmission through an optical fiber.

Figure 3:
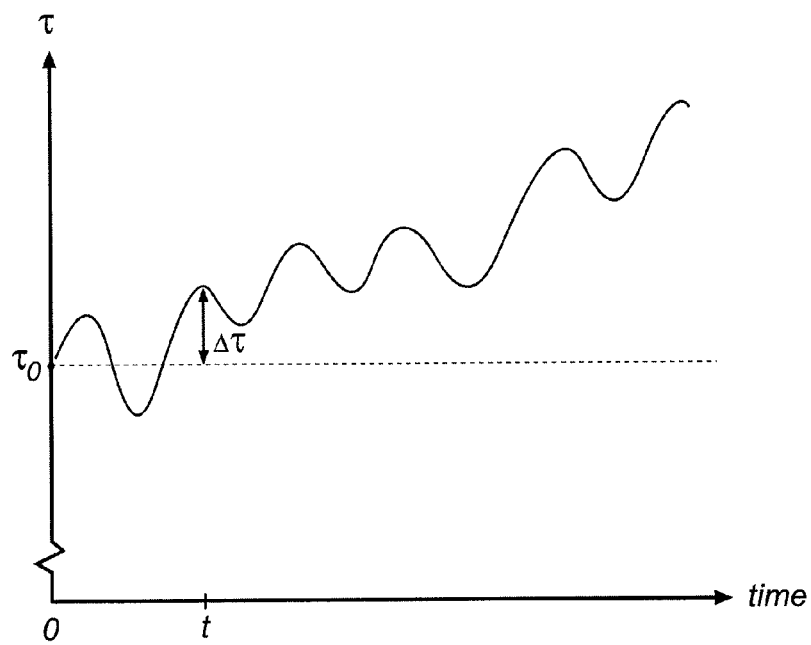
FIG. 3 is a diagram schematically illustrating the variation over time in transmission time of an electromagnetic signal through a dielectric waveguide.

Through the method described above in connection with the flow-chart in FIG. 2, the variations in transmission time/transmission delay of an electromagnetic signal through a dielectric waveguide can be compensated for. This is schematically illustrated in FIG. 3, which shows an exemplary diagram over the variations in transmission time T through the dielectric waveguide (4 in FIG. 1) over time. At an initial time, denoted '0' in FIG. 3, the initial transmission time is determined to be $T_0$. This may, for example, be upon installation of the time transmission system. As time passes, environmental conditions, such as the temperature, vary, which results in varying transmission times T through the dielectric waveguide 4. At a given time t, the instantaneous transmission time T therefore differs from the initial transmission time $T_0$ by the transmission time difference $\Delta T$. This transmission time difference $\Delta T$ is derivable from the above-mentioned difference signal $S_{diff}$, as will be described below under the heading "Theory".

Figure 4:
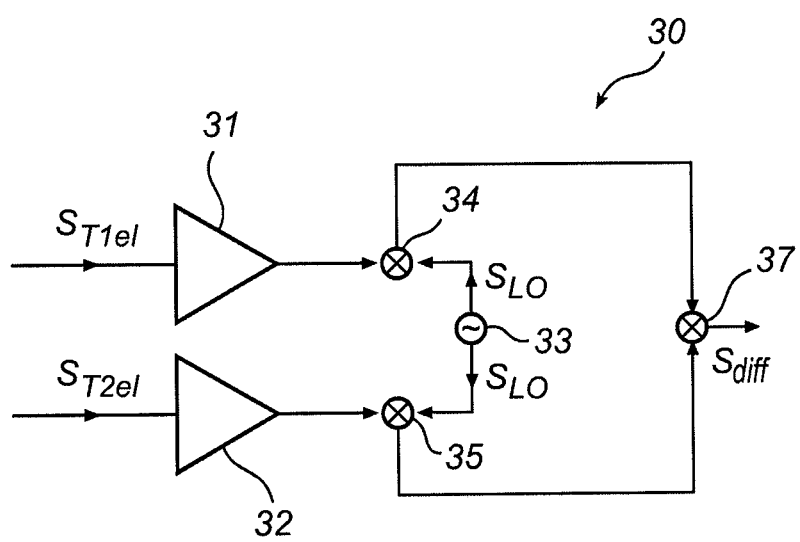
FIG. 4 schematically illustrates an additional embodiment of the time receiver according to the present invention.

Turning now to FIG. 4, an additional embodiment of the time receiver according to the present invention will be described.

The receiver configuration schematically shown in FIG. 4 may be inserted after the first 12 and second 13 optoelectronic detectors in FIG. 1, such that the input signals to the receiver configurations are $S_{T1el}$ and $S_{T2el}$ as is indicated in FIG. 4.

FIG. 4 shows a time receiver 30 that differs from that in FIG. 1 in that the first timing signal $S_{T1el}$ and the second timing signal $S_{T2el}$ are not directly mixed, but that combinations of a local oscillator signal $S_{LO}$ and the first $S_{T1el}$ and second $S_{T2el}$ timing signals are mixed. Moreover, the first $S_{T1el}$ and second $S_{T2el}$ timing signals are amplified. To this end, the time receiver 30 in FIG. 4 comprises a first amplifier 31 arranged to amplify the first timing signal $S_{T1el}$ and a second amplifier 32 arranged to amplify the second timing signal $S_{T2el}$. The time receiver 30 further comprises a local oscillator 33 (in addition to the local oscillator 17 in the timing circuitry 16) and first 34 and second 35 mixers for mixing the signal $S_{LO}$ from the local oscillator 33 with the amplified first $S_{T1el}$ and second $S_{T2el}$ timing signals. Moreover, the time receiver in FIG. 4 comprises a third mixer 37 for combining the outputs from the first 34 and second mixers 35 as the difference signal $S_{diff}$.

Through this configuration, an improved stability is expected as compared to the configuration of FIG. 1.

Additionally, variations to the disclosed embodiments can be understood and effected by the skilled person in practicing the claimed invention, from a study of the drawings, the disclosure, and the appended claims, for example additional signals modulated on additional carriers may be used and the timing signals may have another frequency than the example of 10 MHz provided above.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

Theory

The theory for single way dual wavelength optical fiber time and frequency transfer is based on the transit time T for propagation of a single mode in an optical fiber expressed as the group velocity for a certain distance L and the wavelength $\lambda$.

$$\tau = \frac{L}{c}\left(n - \lambda \frac{dn}{d\lambda}\right), \quad (1)$$

where n is the refractive index and c is the speed of light in vacuum. The transit time T, sometimes known as the group delay time, in a fiber is thus dependent on the refractive index and the wavelength. This means that two different wavelengths will propagate at different velocity in the same fiber. A standard single mode fiber is dependent on environmental conditions, and previous studies have shown that temperature is the most important factor to include in the calculations. By calculating the derivative of the transit time with respect to temperature, both wavelength and refractive index will be taken into account as follows:

$$\frac{d\tau}{dT}\bigg|_{\lambda_N} = \frac{1}{c}\left(\frac{dL}{dT}\left(n - \lambda\frac{dn}{d\lambda}\right) + L\left(\frac{dn}{dT} - \lambda\frac{d^2 n}{dTd\lambda}\right)\right). \quad (2)$$

The variation in transit time as a function of temperature can thus be calculated where $\lambda_N$ (N=1,2) represents the two wavelengths. The equations for the two wavelengths are subtracted from each other, resulting in:

$$\frac{d\tau}{dT}\bigg|_{\lambda_1 - \lambda_2} = \frac{1}{c}\left(\frac{dL}{dT}\left((n_{\lambda_1} - n_{\lambda_2}) + \lambda_2\frac{dn_{\lambda_2}}{d\lambda_2} - \lambda_1\frac{dn_{\lambda_1}}{d\lambda_1}\right) + L\frac{d}{dT}\left((n_{\lambda_1} - n_{n_{\lambda_2}}) + \lambda_2\frac{dn_{\lambda_2}}{d\lambda_2} - \lambda_1\frac{dn_{\lambda_1}}{d\lambda_1}\right)\right). \quad (3)$$

This expression shows how the refractive indices of the two wavelengths are influenced by temperature, and based on this, the variations in transfer time can be calculated. The time transfer technique uses the property that the variations are different, but correlated, which is also supported by experimental results.

The difference in transit time through the fiber will, as shown in eq (3) depend on the variation of length, L, and the variation in refractive index, n. Both these effects will affect the chromatic dispersion of the fiber, but through different properties.

The refractive index of the fiber can be described by the so-called Sellmeier equation:

$$n^2 = A + \frac{B}{1 - C/\lambda^2} + \frac{D}{1 - E/\lambda^2} \quad (4)$$

Where $\lambda$ is the wavelength in µm and the Sellmeier coefficients A, B, C, D and E have been empirically fitted for different glasses. Using the data for fused Silica, we have:

| Sellmeier coefficient | Fitted constants (SiO$_2$) |
|---|---|
| A | 6.90754 * 10$^6$T + 1.31552 |
| B | 2.35835 * 10$^{-5}$T + 0.788404 |
| C | 5.84758 * 10$^{-7}$T + 1.10199 * 10$^{-2}$ |
| D | 5.48368 * 10$^{-7}$T + 0.91326 |
| E | 100 |

From the following equations, the material dispersion can then be calculated as:

$$D_M(\lambda) = \frac{1}{cn}\left[-\frac{4}{\lambda^5}\left\{\frac{BC^2}{(1 - C/\lambda^2)^3} + \frac{DE^2}{(1 - E/\lambda^2)^3}\right\} + \lambda\left(\frac{dn}{d\lambda}\right)^2 + 3n\frac{dn}{d\lambda}\right], \quad (5)$$

where $$\frac{dn}{d\lambda} = -\frac{1}{n\lambda^3}\left(\frac{BC}{(1 - C/\lambda^2)^2} + \frac{DE}{(1 - E/\lambda^2)^2}\right). \quad (6)$$

Using the equations above, it is possible to estimate the transmission time variations with respect to temperature.

As the result of variations in temperature, the length of the optical fiber also varies. It is here assumed that the cabling or mounting will stretch the fiber at increasing temperature, however leaving the volume intact. The variations in dimensions of the glass is assumed to be negligible. If the core of the fiber is modeled as a glass cylinder, of length L and diameter d, a geometrical approach gives that the variation in temperature will change the length with $\Delta L(T-T_0)$ and the diameter with $\Delta d(T-T_0)$, such that $$\frac{\Delta d(T - T_0)}{d} = -\frac{\Delta L(T - T_0)}{2L}. \quad (7)$$

Where T is the temperature and $T_0$ is the reference temperature.

This change in diameter will change the dispersion according to the variation in waveguide dispersion:

$$D_W(\lambda) = -\frac{n_2 \Delta}{c\lambda} V \frac{d^2 (Vb)}{dV^2} \quad (8)$$

Where $n_2$ is the refractive of the cladding and $\Delta$ is the relative difference of refractive index in the core and in the cladding. V and b are the normalized frequency and the normalized propagation constant, respectively, and can be found through:

$$V = ka\sqrt{n_1^2 - n_2^2} \cong kan_2\sqrt{2\Delta}, \quad (9)$$

and $$b = \frac{(\beta/k)^2 - n^2}{n_1^2 - n_2^2}. \quad (10)$$

Here, k is the free-space propagation constant, β is the propagation constance and a=d/2 is the fiber core radius. From these equations, it is apparent that fibers with notable waveguide dispersion, e.g. dispersion shifted fibers, dispersion compensating fibers etc, will have different response to a change in diameter d, than standard fibers where material dispersion is dominant. However, this response should be evaluated for each fiber design, since the term $V(d^2(Vb)/dV^2)$ is between 0 and 1.2 with a maximum at V≈1.2.

We claim:

1. A method of controlling a timing state of a local oscillator (17) being synchronized by a timing signal ($S_{T1}$) provided through one-way transmission from a remote master oscillator (6) through a dielectric waveguide (4), the method comprising the steps of:
    receiving (101) a first timing signal ($S_{T1}$) modulated on a first electromagnetic carrier having a first carrier wavelength ($\lambda_1$) and transmitted through said dielectric waveguide (4);
    receiving (101) a second timing signal ($S_{T2}$) modulated on a second electromagnetic carrier having a second carrier wavelength ($\lambda_2$) different from said first carrier wavelength ($\lambda_1$) and transmitted through said dielectric waveguide (4) together with said first timing signal ($S_{T1}$);
    providing (102) a signal ($S_{diff}$) indicative of a difference between a transmission time ($T_1$) of said first timing signal ($S_{T1}$) and a transmission time ($T_2$) of said second timing signal ($S_{T2}$) through said dielectric waveguide; and
    controlling (103) said timing state of said local oscillator (17) based on said first timing signal ($S_{T1}$) and said signal ($S_{diff}$) indicative of the difference between the transmission time ($T_1$) of said first timing signal ($S_{T1}$) and the transmission time ($T_2$) of said second timing signal ($S_{T2}$).

2. The method according to claim 1, wherein said step (103) of controlling said timing state comprises the steps of:
    delaying said first timing signal ($S_{T1}$) based on the signal ($S_{diff}$) indicative of the difference between the transmission time ($T_1$) of said first timing signal ($S_{T1}$) and the transmission time ($T_2$) of said second timing signal ($S_{T2}$) to form a delayed first timing signal; and
    synchronizing said local oscillator (17) using said delayed first timing signal.

3. The method according to claim 1, wherein said step (103) of controlling said timing state comprises the steps of:
    synchronizing said local oscillator (17) using said first timing signal ($S_{T1}$); and
    controlling a frequency of said local oscillator using the signal ($S_{diff}$) indicative of the difference between the transmission time of said first timing signal and the transmission time of said second timing signal.

4. The method according to claim 1, wherein said first timing signal ($S_{T1}$) and said second timing signal ($S_{T2}$) are provided by said remote master oscillator (6).

5. The method according to claim 1, wherein said first timing signal ($S_{T1}$) and said second timing signal ($S_{T2}$) are in phase when entering said dielectric waveguide (4).

6. The method according to claim 1, wherein said first timing signal ($S_{T1}$) and said second timing signal ($S_{T2}$) are sine waves.

7. A time receiver (3; 30), for providing a time indication based on a timing signal ($S_{T1}$) provided through one-way transmission from a remote master oscillator (6) through a dielectric waveguide (4), the time receiver (3; 30) comprising:
    combining circuitry (20; 33, 34, 35, 37) arranged to receive a first timing signal ($S_{T1}$) modulated on a first electromagnetic carrier having a first carrier wavelength ($\lambda_1$) and transmitted through said dielectric waveguide (4); and a second timing signal ($S_{T2}$) modulated on a second electromagnetic carrier having a second carrier wavelength ($\lambda_2$) different from said first carrier wavelength ($\lambda_1$) and transmitted through said dielectric waveguide (4) together with said first timing signal ($S_{T1}$), said combining circuitry being configured to output a signal ($S_{diff}$) indicative of a difference between a transmission time through said dielectric waveguide of said first timing signal and said second timing signal; and
    a local oscillator (17) being controllable to provide said time indication based on said first timing signal ($S_{T1}$) and the signal ($S_{diff}$) indicative of said difference between the transmission time of said first timing signal and said second timing signal through said dielectric waveguide.

8. The time receiver (3) according to claim 7, wherein said combining circuitry comprises:
    a first sensor (12) arranged and configured to convert said first timing signal ($S_{T1}$) to a first electrical timing signal ($S_{T1el}$);
    a second sensor (13) arranged and configured to convert said second timing signal ($S_{T2}$) to a second electrical timing signal ($S_{T2el}$); and
    a mixer (20) arranged to receive said first electrical timing signal ($S_{T1el}$) and said second electrical timing signal ($S_{T2el}$) and configured to output the signal ($S_{diff}$) indicative of said difference between the transmission time through said dielectric waveguide of said first timing signal and said second timing signal.

9. The time receiver (3; 30) according to claim 7, further comprising:
    delay circuitry arranged to receive said first timing signal and the signal indicative of said difference between the transmission time through said dielectric waveguide of said first timing signal and said second timing signal, and configured to adjust a delay of said first timing signal by a delay time based on the signal indicative of said difference.

10. The time receiver (3; 30) according to claim 7, wherein said local oscillator (17) is a controllable oscillator being arranged to be controlled using the signal ($S_{diff}$) indicative of said difference between the transmission time through said dielectric waveguide of said first timing signal and said second timing signal.

11. The time receiver (3; 30) according to claim 7, wherein said first and second electromagnetic carriers are optical carriers, and said dielectric waveguide is an optical fiber.

12. A one-way time transmission system (1) comprising:
a time transmitter (2) comprising:
- a first source (7) arranged to provide a first electromagnetic carrier having a first carrier wavelength ($\lambda_1$);
- a second source (8) arranged to provide a second electromagnetic carrier having a second carrier wavelength ($\lambda_2$) different from the first carrier wavelength ($\lambda_1$); and
- a master oscillator (6) arranged to control said first source (7) and said second source (8) to modulate a timing signal ($S_T$) on said first electromagnetic carrier and on said second electromagnetic carrier; and
- a time receiver (3) according to any one of claims 7 to 11 arranged to receive said timing signal modulated on the first electromagnetic carrier as a first timing signal ($S_{T1}$), and to receive said timing signal modulated on the second electromagnetic carrier as a second timing signal ($S_{T2}$) following transmission through a dielectric waveguide (4).

13. The one-way time transmission system according to claim 12, wherein said first and second electromagnetic carriers are optical carriers, and said dielectric waveguide is an optical fiber.

* * * * *